United States Patent [19]
Waters et al.

[11] Patent Number: 5,155,741
[45] Date of Patent: Oct. 13, 1992

[54] HIGH DATA RATE LONG PULSE COMPRESSION WAVEFORM COMMUNICATION SYSTEM FOR M-ARY ENCODING VOICE MESSAGES FOR AIR TRAFFIC CONTROL SYSTEMS

[75] Inventors: William M. Waters, Millersville; George J. Linde, Accokeek, both of Md.

[73] Assignee: The United States of America as represented by the Secretary of the Navy, Washington, D.C.

[21] Appl. No.: 648,696

[22] Filed: Jan. 31, 1991

[51] Int. Cl.$^5$ .............................................. H04K 1/00
[52] U.S. Cl. ........................................... 375/1; 380/34
[58] Field of Search ................. 375/1; 380/34, 35, 33, 380/31, 49, 50; 455/59, 61; 370/120; 381/31, 32, 33

[56] References Cited
U.S. PATENT DOCUMENTS

| | | |
|---|---|---|
| 4,225,935 | 9/1980 | Zscheile, Jr. et al. . |
| 4,550,414 | 10/1985 | Guinon et al. . |
| 4,669,089 | 5/1987 | Gahagan et al. ............... 375/1 |
| 4,774,715 | 9/1988 | Messenger . |
| 4,847,861 | 7/1989 | Hamatsu et al. . |
| 4,866,734 | 9/1989 | Akazawa et al. . |
| 4,866,735 | 9/1989 | Mori et al. . |
| 4,963,030 | 10/1990 | Makur .......................... 381/31 X |
| 5,042,050 | 8/1991 | Owen ........................... 375/1 |

FOREIGN PATENT DOCUMENTS
0041829 3/1985 Japan .......................... 375/1

Primary Examiner—Tod Swann
Attorney, Agent, or Firm—Thomas E. McDonnell; George Jameson

[57] ABSTRACT

A communications system which decreases noise errors and increases information rate without sacrificing bandwidth is formed by a transmitter and a receiver designed to handle long pulse compression wavforms. An encoder connected to the transmitter converts a voice message into digitized voice words, encodes the digitized voice words into the time shifted code sequences, and phase modulates the long pulse compression waveform, producing a M-ary coded signal at the output of the transmitter. The receiver is connected to a decoder which includes at least one convolver for computing the correlation of received digitally coded words with independently generated time shifted code sequences, and a controller for generating a plurality of data values according to the largest correlation values, and a transducer responsive to the data values.

12 Claims, 6 Drawing Sheets

HIGH DATA RATE LONG PULSE COMPRESSION WAVEFORM COMMUNICATION SYSTEM FOR M-ARY ENCODING VOICE MESSAGES FOR AIR TRAFFIC CONTROL SYSTEMS

FIELD OF THE INVENTION

The present invention relates generally to a high data rate system using long pulses and, more specifically, to a high data rate communications system for encoding voice messages using M-ary encoding in air traffic control systems.

BACKGROUND OF THE INVENTION

Telecommunications channels which are constrained to operate with long pulse compression waveforms to reduce required peak power are generally limited in information rate. For example, when a waveform with constant amplitude A and length T is employed, phase modulation and M-ary encoding can be used to transfer digital code words and recover information, but at a rate which is slowed as waveforms are lengthened.

Figure 1:
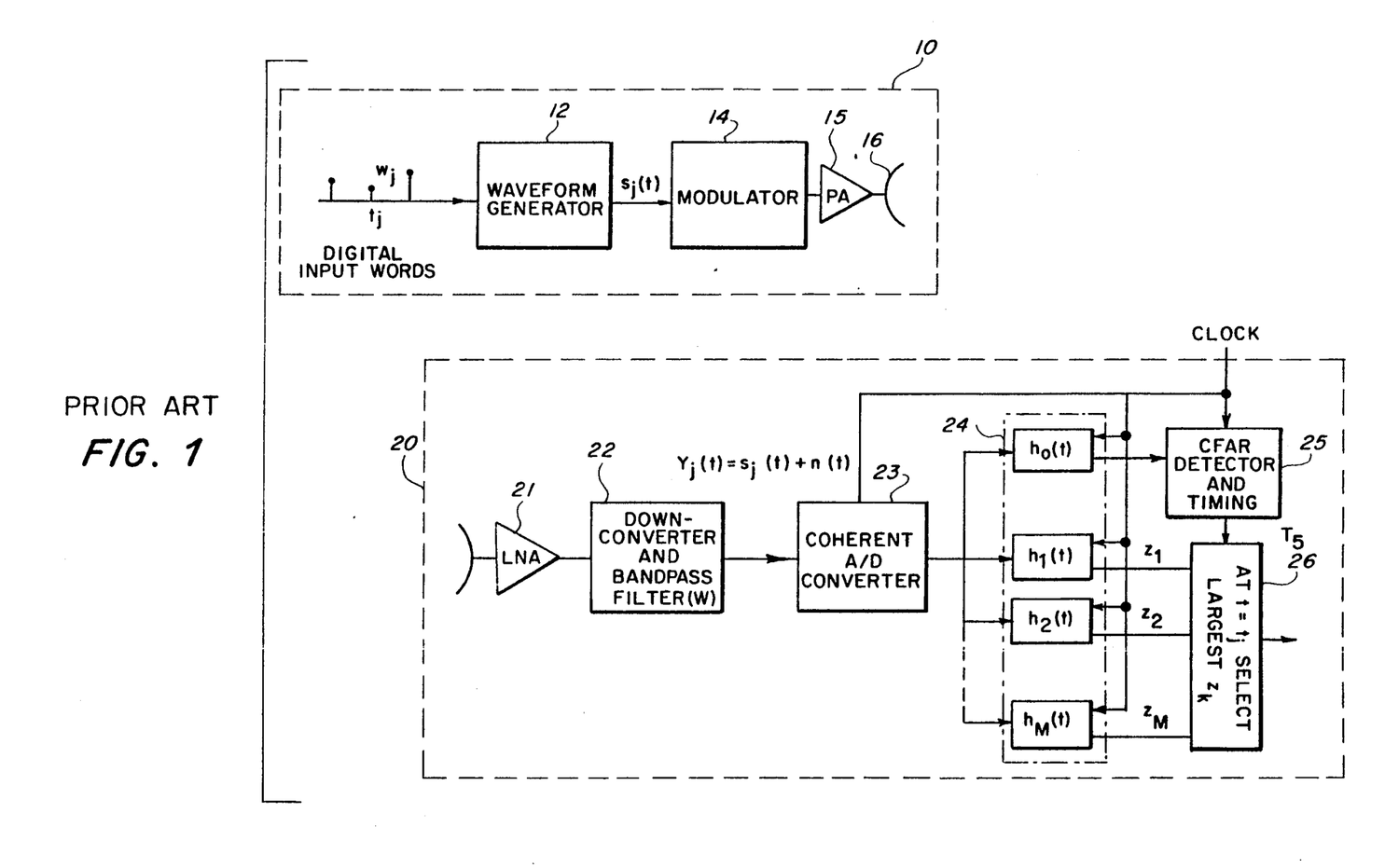
FIG. 1 is a block diagram of a conventional pulse code communications link upon which the present invention is based.

Several prior art methods of transmitting signals using pulse code modulation exist. FIG. 1 shows a generic version of one type of conventional system. A transmitter 10, which encodes a digital input word onto a carrier signal by phase modulation, includes a waveform generator 12 responsive to the digital input word for selecting from a number of different waveforms. Waveform generator 12 outputs analog waveforms sj(t), which are modulated onto a radio frequency carrier in the form of a long pulse compression waveform by a modulator 14. Modulated waveforms from modulator 14 are amplified by an amplifier 15 and transmitted over a transmission link using an antenna 16.

The transmitted long pulse compression waveform is received by a receiver 20, which includes a low noise amplifier 21 and a converter 22 responsive to the output of amplifier 21. Converter 22 demodulates the received waveform back into an analog signal sj(t) with a noise component n(t). A coherent analog-to-digital converter (ADC) 23 converts the analog waveform sj(t)+n(t) into a digital signal. The first transmitted waveform $s_o(t)$ is a timing pulse, which is processed by matched filter ho(t) in bank 24 and output to constant false alarm rate (CFAR) and timing circuitry 25. Circuitry 25 identifies the timing pulse $S_0(t)$ and generates a timing signal T. The bank of matched filters 24 decodes the digital signal by computing the correlation between the received digital signal and M codes stored in filter bank 24. A decoder circuit 26, in response to signal $T_s$ and the correlation values generated by filter bank 24, selects the largest correlation value and outputs a code corresponding to the code producing that correlation value.

Examples of the generic system shown in FIG. 1 are disclosed in, e.g., U.S. Pat. No. 4,774,715, which discloses a system using a time shifted pseudo-noise code and an amplitude comparator to decode an incoming signal; U.S. Pat. No. 4,550,414, which discloses a method of automatically detecting a correlation signal using a matched filter arrangement; and U.S. Pat. Nos. 4,225,935 and 4,866,734, which disclose similar receiver methods using correlators and convolvers.

M-ary encoding and phase modulation, where M=256, allows encoding information within a signal, which is based on long pulse compression waveforms, to thereby recover a significant portion of the information rate transmission potential lost by using phase modulation encoding. Heretofore a high data rate communications system using long pulses and 256-ary coding has not been produced.

SUMMARY OF THE INVENTION

Accordingly, it is an object of the present invention to provide an improved communications system which increases data transmission rates without decreasing the length of the transmitter pulse.

It is a further object of the present invention to provide an improved communications system with reduced power requirements for detecting an incoming pulse by distributing a pulse code modulated signal across a long pulse compression waveform.

It is another object of the present invention to provide an improved communications system which increases information rate without increasing bandwidth.

It is a further object of the present invention to provide an improved communications system which economically achieves a relatively high data transmission rate by a 256-ary coding system.

These and other objects are achieved by a high data rate communications system employing long pulse compression waveforms and comprising a transmitter for generating pulsed output signals, an encoder coupled to the transmitter for encoding a voice message on the pulsed output signals and for generating a time shifted code sequence for controlling the encoding of the pulsed output signals. A receiver receives the pulsed output signals and generates digitally coded words. A decoder, coupled to the receiver, receives the digitally coded words and reproduces the voice message.

In accordance with one aspect of the invention, the encoder preferably comprises a modulator coupled to the transmitter and a pulse generator coupled to the modulator for generating the pulsed output signals. A circular shift register is coupled to the modulator for generating the time shifted code sequence, and the modulator modulates the pulsed output signal responsive to the time shifted code sequence. The decoder preferably further comprises a converter for converting the analog voice message to digitized voice words, and a memory for storing the digitized voice words. A controller is also preferably provided for controlling the circular shift register in response to the stored digitized voice words.

In accordance with a further aspect of the invention, the decoder preferably comprises at least one convolver for computing a plurality of correlation values between the digitally coded words and the time shifted code sequence. The decoder preferably further comprises a controller, which determines the largest of the correlation values, and a decoder memory for storing digital integer values corresponding to the time shifted code sequence providing the largest of the correlation values. Preferably, the decoder further comprises a converter for converting the integer values to the voice message.

BRIEF DESCRIPTION OF THE DRAWINGS

These and other objects, features and advantages of the invention are disclosed in or apparent from the following detailed description of preferred embodiments, which are described with reference to the drawings, in which.

DESCRIPTION OF THE PREFERRED EMBODIMENTS

Figure 2:
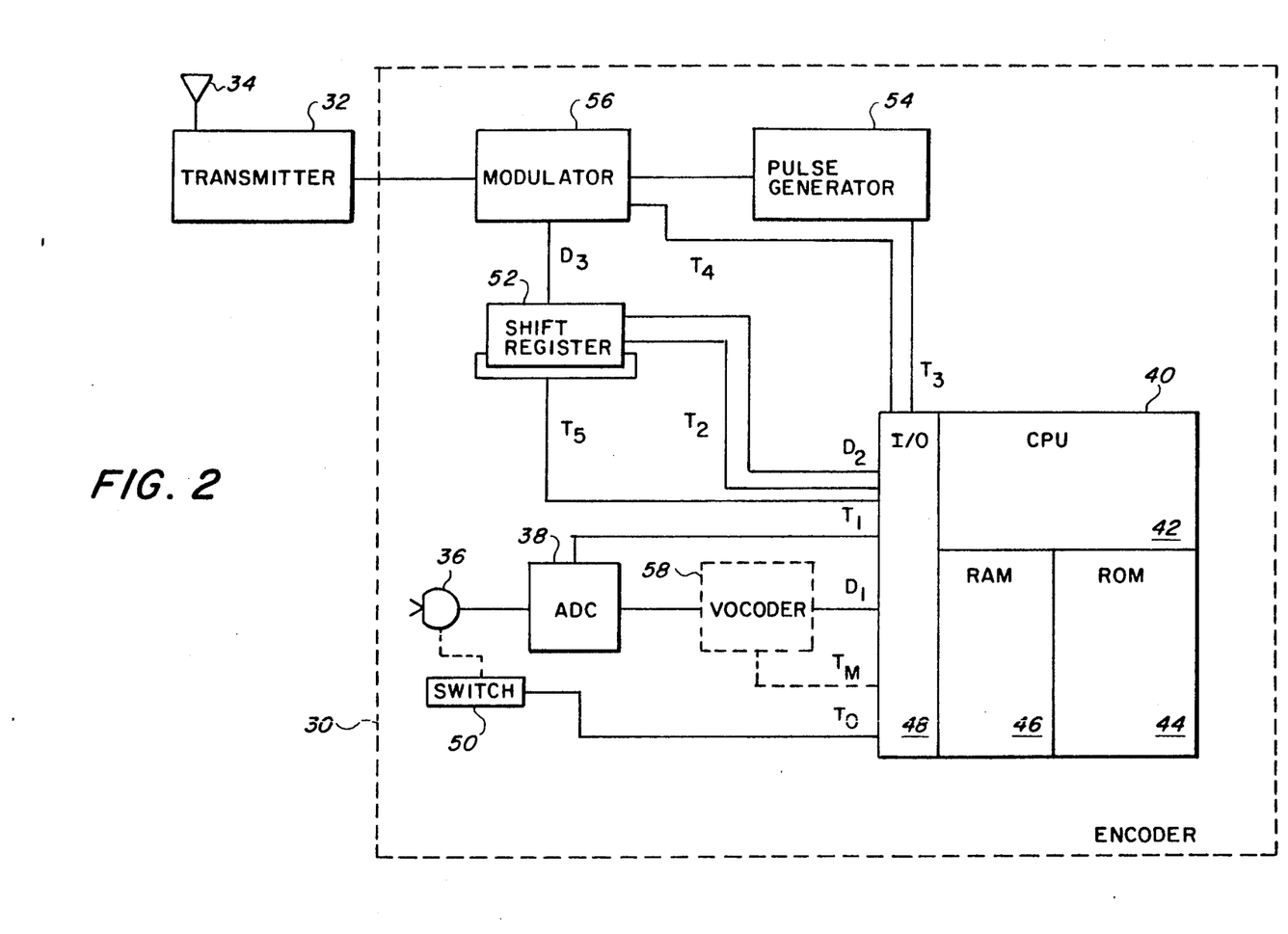
FIG. 2 is a block diagram of an encoder of the present invention coupled to a transmitter for a long pulse compression waveform M-ary communications system.

FIG. 2 shows a transmission half of a long pulse compression waveform communications system in accordance with the present invention. The transmission system includes an encoder 30 connected to a transmitter 32, which is connected to an antenna 34. Encoder 30 comprises a microphone 36; an analog-to-digital converter (ADC) 38 connected to the output of microphone 36; and an input controller 40 coupled to the output of ADC 38. Controller 40 further comprises a central processing unit 42; a read only memory (ROM) 44 storing fixed data and programs for operating CPU 42; random access memory (RAM) 46 for storing digital data; and an input-output interface (I/O) 48. CPU 42, ROM 44, RAM 46 and I/O 48 cooperate to control the operation of encoder 30 as described in detail below with respect to FIGS. 3 and 4. Controller 40 is connected to the input of a shift register 52 and a pulse generator 54. A modulator 56, responsive to the outputs of shift register 52 and pulse generator 54, generates the input signal to transmitter 32.

Microphone 36 is a conventional microphone which converts a voice message from an operator into corresponding analog voice signals. Preferably, microphone 36 further comprises a push-to-talk switch 50 connected to controller 40 through I/O 48, which switch generates a control signal. $T_0$ used to initiate operation of encoder 30, as detailed below. ADC 38 is a conventional converter, which converts the analog voice signals into digital signals constituting digitized voice words. ADC 38 advantageously generates a 4 bit voice word for each sample taken. Preferably, ADC 38 samples the analog voice signals six times per millisecond (msec), thereby producing 24 bits per msec, i.e., six 4-bit digitized voice words. RAM 46 is connected to ADC 38 through I/O 48 and for air traffic control systems advantageously is about 18,000 bytes long to accommodate about 36,000 4 bit digitized voice words corresponding to 6 seconds of voice message.

Once an entire 6-second voice message is converted to digitized voice words and stored in RAM 46, stored digital data is read out from RAM 46 one byte (8 bits or two 4 bit voice words) at a time by CPU 42 for use in controlling shift register 52 as described in detail below. Each byte output from RAM 46 corresponds to an integer number. For example, two 4 bit words 0000 and 0000 form a 1 byte word 00000000 corresponding to an integer number 0, 4 bit words 0000 and 0001 produce 1 byte word 00000001 corresponding to integer number 1, and so on. Thus, each byte read from RAM 46 corresponds to an integer number ranging from 0-255, and consists of two 4 bit digitized voice words generated by ADC 38 from the analog voice signals.

Controller 40 generates a shift signal output to shift register 52 in response to the digital data read from RAM 46, so as to cause the contents of shift register 52 to be shifted in accordance with the number of shifts indicated by CPU 42. Preferably, shift register 52 is a 256 bit circular shift register. Upon initialization of encoder operation, shift register 52 advantageously is loaded with a pseudo-random initial time shifted code sequence stored as fixed data in ROM 44. For example, in a 7-ary system, assume that signals $s_m$ are chosen from a set which are time shifts of the same sequence, such as the three stage shift register code $P(x) = x^3 + x + 1$. $P(x)$ produces the seven sequences shown in column 1 of the table below.

TABLE

| $s_m$ | Column 1 | Column 2 |
|---|---|---|
| $s_1$ | 0001101 | 0001101 |
| $s_2$ | 1000110 | 1000110 |
| $s_3$ | 0100011 | 0100011 |
| $s_4$ | 1010001 | 1010001 |
| $s_5$ | 1101000 | 1101000 |
| $s_6$ | 0110100 | 0110100 |
| $s_7$ | 0011010 | 0011010 |

As shown in column 1, each of the seven code sequences is a time shifted copy of the same sequence, e.g., the second sequence is the same as the first sequence shifted one step to the right with the last symbol becoming the first symbol in the sequence. Thus, each sequence is obtained by stepping the circular shift register to the right. For clarity, column 2 shows the codes of column 1 aligned on the first bit of the first code sequence as the code sequences are shifted sequentially. The first 7 bit digital word designated $s_1$ is arbitrarily selected to correspond to the integer 0. One shift of the time shifted code sequence produces the 7 bit digital word shown as $s_2$, which corresponds to the integer 1. Each time shifted code sequence thus corresponds to an integer number. Preferably, shift register 52 is a 256 bit circular shift register which produces 256 possible time shifted code sequences corresponding to a range of integers from 0 to 255. Thus, each byte of digital data stored in RAM 46 corresponds to an integer in the range 0-255 as well as one of the possible 256 time shifted code sequences produced by shift register 52.

Controller 40 also outputs a control signal through I/O 48 to cause pulse generator 54 to generate a pulse, which is input to modulator 56 along with a serial bit output from shift register 52. Thus, modulator 56 modulates the pulse generated by pulse generator 54 256 times in response to the output of shift register 52. The output of modulator 56 is the input to transmitter 32, which outputs the 256-ary modulated signal through antenna 34.

Figure 3:
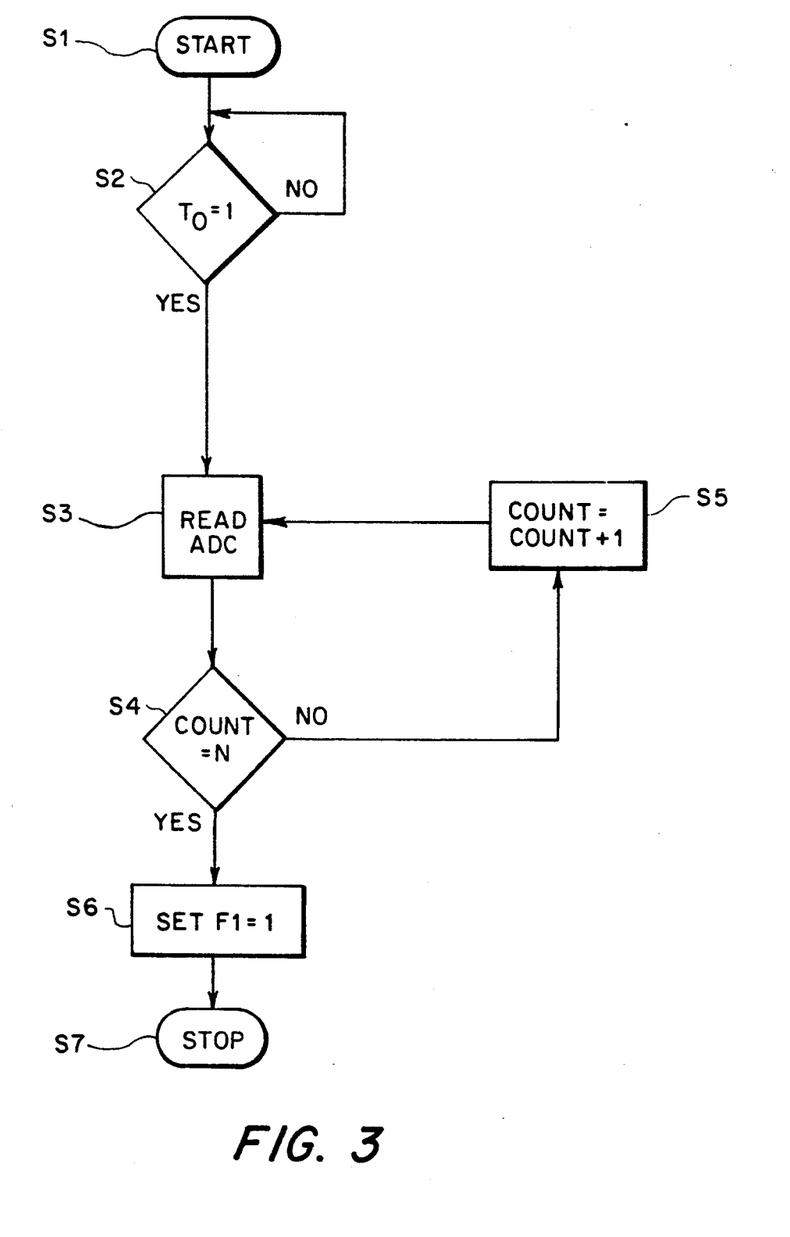
FIG. 3 is a flow chart illustrating the sequence of operations of a preferred method according to the present invention for receiving and storing digital data.
Figure 4:
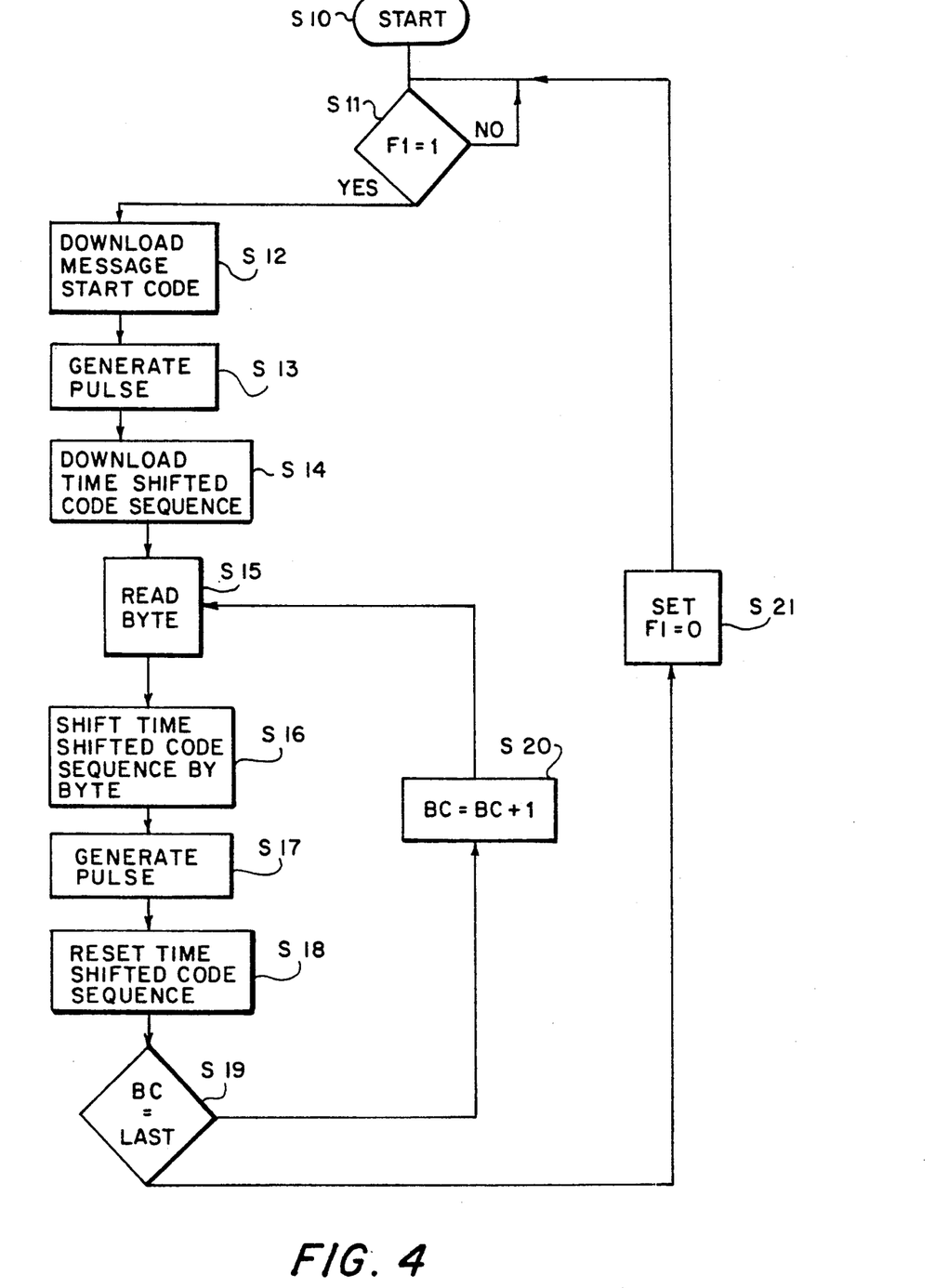
FIG. 4 is a flow chart illustrating the sequence of operations of a preferred method according to the present invention for converting digital data into time shifted code sequence modulated signals.

The operation of encoder 30 can best be understood by referring to FIGS. 3 and 4 showing flow charts for digital data acquisition and data encoding, respectively, in accordance with the present invention.

Referring specifically to FIG. 3, digital data acquisition is initiated at step S1 when controller 40 is energized, causing CPU 42 to initialize RAM 46, and set a program flag F1 equal to zero and a count value equal to zero. At step S2, controller 40 checks to see if a start signal $T_0$ has been received from switch 50. If signal $T_0$ is detected, data acquisition is initiated at step S3 for a predetermined number of sampling cycles, N, corresponding to the sample rate of ADC 38 and a predetermined message time period, e.g., six seconds. If start signal $T_0$ has not been received, the program returns to step S2 and checks for start signal $T_0$ again.

During step S3, CPU 42 provides a timing and control signal $T_1$ I/O 48 to ADC 38 to cause ADC 38 to sample and convert the analog voice signal then being generated by microphone 36 into a digitized 4-bit voice word, which is outputted to RAM 46 for storage via data line $D_1$ and I/O 48. At step S4, the program checks to see if the count value is equal to N. If the count value is not equal to N, the count value is incremented by one at step S5, and program control returns to step S3 to acquire the next digitized voice word. If the count value is equal to N, step S6 is performed, which sets flag F1 equal to one. The data acquisition program then stops at step S7, which resets the count value N equal to zero.

Referring to FIG. 4, the data encoding process starts at step S10, which is initiated when encoder 30 is turned on. At step S11, the program checks to see if flag F1 is equal to one. If F1 is not equal to one, step S11 is repeated until F1 is equal to one, at which time data encoding starts at step S12.

During step S12, a message start code stored in ROM 44 is downloaded through I/O 48 to shift register 52 over data line $D_2$. I/O 48 also provides timing and control signal $T_2$ to control the operation of shift register 52. Advantageously, the message start code word is different from any of the 256-ary time shifted code sequences discussed above. For example, the 7 bit code sequence 1011000 is the mirror image of the time shifted code sequence corresponding to code $s_1$ shown in the TABLE above but is not produced by the shift sequence. Thus, sequence 1011000 can be used to provide a unique message start code.

During step S13, a set of timing and control signals $T_2$, $T_3$ and $T_4$ are respectively provided to shift register 52, pulse generator 54 and modulator 56; which cause pulse generator 54 to generate a pulse; shift register 52 to output the message start code over data line to modulator 56; and modulator 56 to modulate the pulse produced by pulse generator 54 in response to the serial output of shift register 52.

At step S14, CPU 42 downloads from ROM 44 the initial time shifted code sequence, corresponding to an integer value of zero, to shift register 52 over data line $D_2$ in response to timing and control signal $T_2$. In addition, a byte count (BC) value is set equal to one. Digitized voice words stored in RAM 46 are then encoded and passed to transmitter 32 according to the program loop comprising steps S15 through S19.

During step S15, CPU 42 reads the integer value of the byte stored in RAM at the position equal to the BC value, e.g, the first byte stored in RAM 46. At step S16, CPU 42 generates a timing and control signal $T_5$, causing shift register 52 to recirculate bits for a number of timing and control signals $T_2$ equal to the integer value of the byte read from RAM 46. Thus, the time shifted code sequence stored in shift register 52 is the sequence having the assigned integer value corresponding to the integer value of the byte read from RAM 46 in step S15. During step S17, CPU 42 generates timing and control signals $T_2$, $T_3$ and $T_4$ without timing and control signal $T_5$, causing pulse generator 54 to generate a pulse, shift register 52 to serially output the time shifted code sequence stored in shift register 52 to modulator 56, and modulator 56 to modulate the pulse responsive to the time shifted code sequence. Thus, a pulse to be transmitted is modulated by the 256 bit time shifted code sequence and is output to transmitter 32.

During step S18, CPU 42 generates timing and control signals $T_2$ and $T_5$ to reset the time shifted code sequence back to the initial value corresponding to the integer value zero. At step S19, the program performs a check to determine if the value of BC is equal to a value LAST, corresponding to the total number of bytes of digital data stored in RAM 46. If BC is not equal to LAST, BC is incremented by one at step S20 and steps S15-S19 are repeated using each new byte of digital data from RAM 46 determined by the value BC. If BC is equal to LAST, flag F1 is reset to zero at step S21 and the program returns to step S11.

The encoding apparatus and method described above produces a modulated signal of constant amplitude with a large bandwidth-time product, which reduces power output of transmitter 32 needed to form a detectable signal at a receiver. In addition, 256-ary encoding permits transmission of 8 bits per pulse, thereby increasing the information rate of the transmitter 32 by a factor of eight over conventional data transmissions systems.

Figure 5:
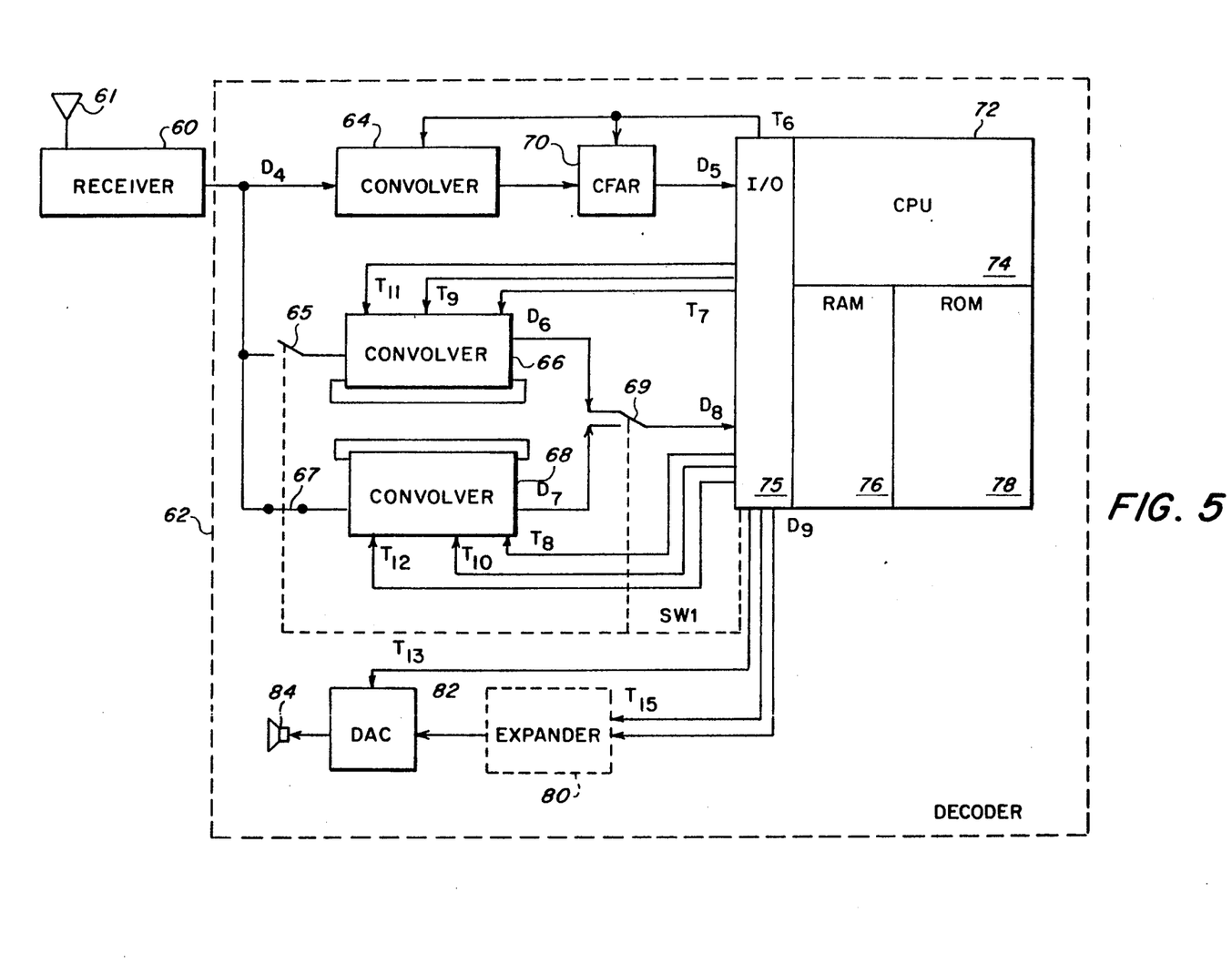
FIG. 5 is a block diagram of a preferred embodiment of a receiver and a decoder in accordance with the present invention for a long pulse compression waveform M-ary communications device.

FIG. 5, shows the receiving half of a long pulse compression communication system in accordance with the present invention, which comprises a receiver 60 and antenna 61 coupled to a decoder 62. Preferably, decoder 62 is incorporated into receiver 60, but advantageously is a stand-alone unit adapted for retrofit connection to an existing receiver 60. Receiver 60 advantageously includes circuitry for processing the received signal from transmitter 32 of FIG. 2 in a conventional manner to generate a 256 bit serial digitally coded word responsive to each received pulse signal.

Decoder 62 comprises a bank of three convolvers 64, 66, and 68, which receive the digitally coded words output from receiver 60. Preferably, convolvers 64, 66 and 68 are conventional convolvers capable of operating on at least 256 chip pulses, for example, Motorola 256 stage All-Range Convolver Modules, which are 1×4 bit multipliers and accumulators with an update rate of 50 nanoseconds (ns), and a maximum operating speed of 20 megahertz (MHz). Convolver 64 is connected directly to the input data line $D_4$ from receiver 60 while convolvers 66 and 68 are selectively connected to data line $D_4$ through switches 65 and 67, respectively. The output of convolver 64 is connected to conventional constant false alarm rate (CFAR) circuitry 70, hereafter CFAR 70, which is connected to a decoder controller 72. Controller 72 further comprises a central processing unit (CPU) 74, an input-output interface (I/O) 75, a random access memory (RAM) 76 providing data storage, and a read only memory (ROM) 78 providing operating program storage. CPU 74, I/O 75, RAM 76 and ROM 78 advantageously cooperate to control the operation of decoder 62 as described in greater detail below. The outputs of convolvers 66 and 68, denoted data lines $D_6$ and $D_7$, respectively, are connected through switch 69 and a common data line Da to I/O 75. Preferably, I/O 75 is connected to digital-to-analog converter (DAC) circuitry 82, which converts digital data output from controller 72 to analog voice signals received by transducer 84.

Convolvers 64, 66 and 68 enable the cross-correlation to be determined between the received digitally coded words and 256 bit code sequences stored in memory advantageously included within each convolver. Cross-correlation values advantageously are used to identify the message start code as well as to perform M-ary decoding. For example, in a 7-ary system, assume the first digitally coded word received from receiver 60 is the time shifted code sequence 0001101 shown as $s_1$ in the table above. The output of one of the convolvers is $C_{ij}$, where i indicates the placement of the particular time shifted code sequence in the set of sequences, and ranges between 1 and 7 in a 7-ary system; and where j is the shift count number, ranging from 1 to 7 in a 7-ary system. The auto-correlation $C_{ii}$, in this case $C_{11}$, is a maximum value, 7 in the exemplary 7-ary system. Cross-correlations $C_{i2}$, $C_{i3}$, $C_{i4}$, $C_{i5}$, $C_{i6}$, and $C_{i7}$ all produce values of 3. If an error occurs in the code sequence, the maximum cross-correlation value obtained will be less than the maximum auto-correlation value, 7 in the exemplary system, but greater than the other cross-correlation values produced from the remainder of the set of sequences, i.e., 3. Thus, each incoming digitally coded word is identified by comparing its correlation to code sequences stored in the memories of convolvers 64, 66 and 68. Preferably, convolver 64 stores the message start code; and convolvers 66 and 68 store the initial time shifted code sequence corresponding to the integer zero and are advantageously configured to form integral circular shift registers.

Figure 6:
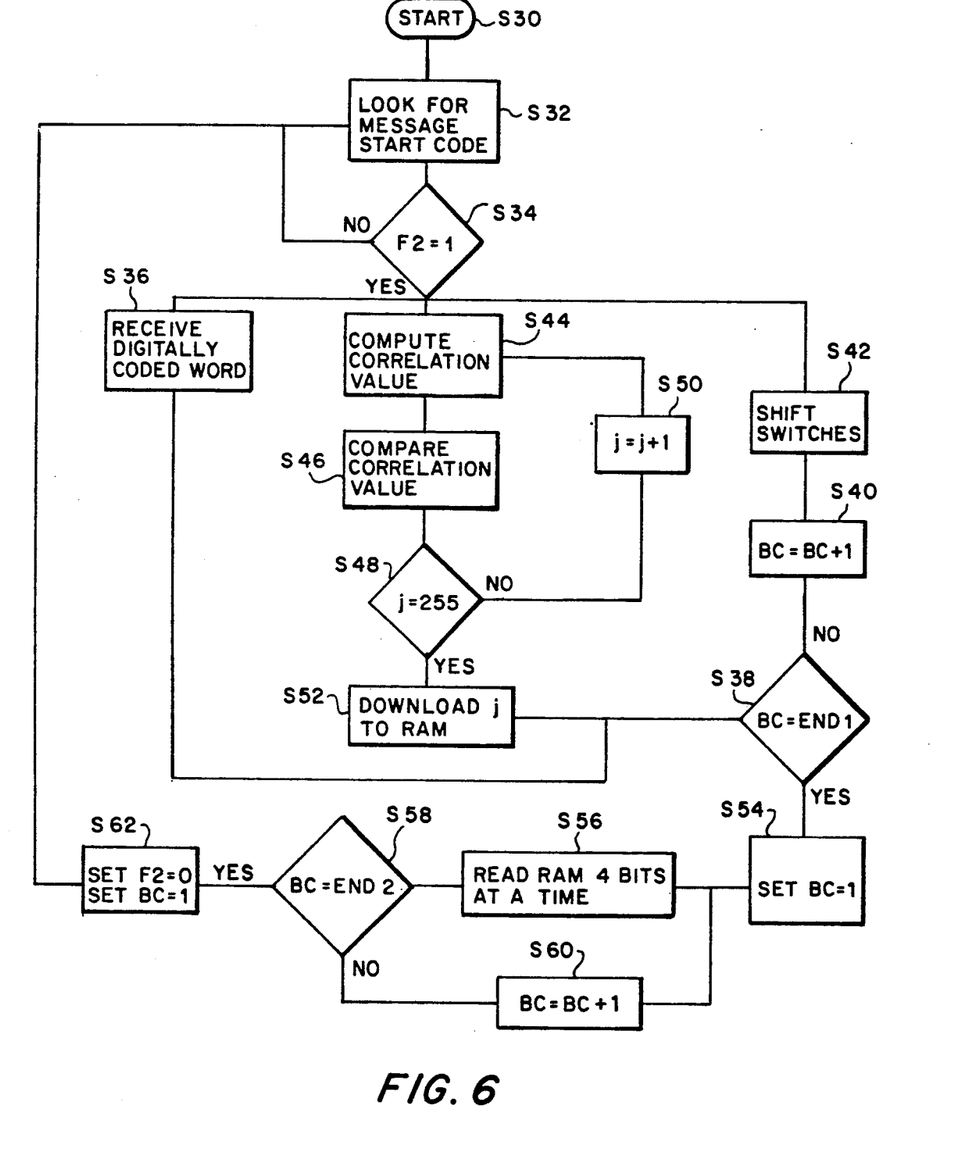
FIG. 6 is a flow chart illustrating the overall sequence of operations of a preferred method according to the present invention for processing received digital words to generate the voice message.

The operation of decoder 62 will now be described referring to the flow chart of FIG. 6.

At step S30, which is initiated when power is applied to decoder 62, CPU 74, RAM 76 and convolvers 66 and 68 are initialized. Preferably, during step S30, a flag F2 is set equal to zero, a byte count value BC is set equal to one, a value j is set equal to zero, and a repeating timing and control signal $T_6$ is generated and supplied through I/O 75 to convolver 64 and CFAR 70. During step S32, convolver 64, in response to timing and control signal $T_6$, downloads one bit of the serial digitally coded word from receiver 60 through data line $D_4$, and computes the cross-correlation between the downloaded digitally coded word and the message start code stored in convolver 64. The cross-correlation value produced by convolver 64 is downloaded to CFAR 70, which compares the cross-correlation value with a predetermined threshold value. If the cross-correlation value is greater than the threshold value, CFAR generates a value of one, which is input to CPU 74 via data line $D_5$ and I/O 75. For cross-correlation values below the threshold, CFAR 70 generates a value of zero, which is similarly input to CPU 74. CPU 74 sets flag F2 equal to the output of CFAR 70. At step S34, the program checks to see if F2 is equal to one. If F2 is not equal to one, the program returns to step S32 and downloads the next bit of the digitally coded word. (Here, convolver 64 operates as a first-in-first-out buffer, discarding the first bit received if the total number of bits exceeds 256.) If F2 is equal to one, decoding is initiated at step S36. Thus, controller 72 checks all bits generated by receiver 60 until a digitally coded word matching the message start code is received, and then begins decoding starting with the next digitally coded word generated.

During step S36, one of the convolvers 66, 68 receives a digitally coded word from receiver 60 while the other convolver 68, 66 computes correlations between the time shifted code sequence and a digitally coded word received previously, in accordance with the states of switches 65, 67 and 69. For clarity in the following description, the initial positions of switches 65, 67 and 69 are assumed to be those shown in FIG. 5, causing convolver 68 to receive the next digitally coded word after the message start code is received. When step S36 is initiated, convolver 68 receives timing and control signal $T_8$ from CPU 74 via I/O 75, and stores the digitally coded word received from data line $D_4$ through switch 67.

While step S36 is being performed, decoding is being performed simultaneously by convolver 66 under the control of the program loop comprising steps S44 through step S50, and step S52. (During input of the digitally coded word following detection of the message start code, convolver 66 has not yet received a digitally coded word. The following discussion assumes that a digitally coded word has been received previously by convolver 66. Preferably, controller 72 discards the results produced by convolver 66 during the first pass of the decoding loop.) During step S44, convolver 66 receives a timing and control signal $T_{11}$ from CPU 74 through I/O 75 which causes convolver 66 to compute the correlation between the stored digitally coded word and the initial time shifted code sequence stored in the convolver memory. The correlation value is output to CPU 74 through data line $D_6$, switch 69, data line $D_8$ and I/O 75. During step S46, CPU 74 compares the just computed correlation value with the previous stored correlation value. (For the first computed correlation value, CPU 74 compares the correlation value with an initial zero value, initialized during step S30.) CPU 74 stores the larger of the two values, along with the value j corresponding thereto.

At step S48, a check is made to determine if the value j is equal to 255. If j is not equal to 255, step S50 is executed to increment j by one and to shift the time shifted code sequence stored in convolver 66. CPU 74 accomplishes the sequence shifting by generating timing and control signal $T_9$ to cause convolver 66 to shift the time shifted code sequence one bit to the right, with the rightmost bit being recirculated to become the leftmost bit of the 256 bit time shifted code sequence. Steps S44–S50 are repeated until j is determined to equal 255 in step S48, in which case step S52 is executed, causing CPU 74 to transfer the value j, corresponding to the largest correlation value stored during step S46, to RAM 76, and to reset the stored correlation value to zero. Thus, the 1 byte word corresponding to the integer j is stored in RAM 76.

When both steps S36 and S52 have been completed, the program checks to see if the value of BC is equal to a predetermined value, END1, which is equal to the number of digitally coded words expected plus one. If BC is not equal to END1, step S40 is performed to increment the value of BC by one. Then step S42 is performed to change the states of switches 65, 67 and 69 so as to cause convolver 66 to receive the next digitally coded word and convolver 68 to compute the correlation values of the digitally coded word just received. More specifically, CPU 74 generates timing and control signal SW1, which is applied to switches 65, 67 and 69, causing each to shift to the state opposite that shown in FIG. 5. Thus, the input of convolver 66 is connected to data line $D_4$ through switch 65 while the output of convolver 68 is connected to data line $D_8$ through switch 69. Program control then passes to steps S36 and S44 as before. During the next pass through the loop comprising steps S36 through S52, convolver 66 loads a digitally coded word in response to timing and control signal $T_7$, while convolver 68 computes correlation values in response to timing and control signals $T_{10}$ and $T_{12}$. If BC is equal to END1, indicating that all expected digitally coded words have been received and decoded, step S54 is performed, which resets BC equal to one in preparation for converting the digital data stored in RAM 76 to the original voice message in accordance with a loop comprising the steps S56 through S60.

During step S56, CPU 74 sequentially downloads the data stored in RAM 76, in 4 bit digital words, to DAC 82 via I/O 75 and data line $D_9$. DAC 82 converts each 4 bit digital word to an analog signal, which is input to transducer 84, in response to timing and control signals $T_{13}$ from controller 72. After a 4 bit digital word is downloaded at step S56, a check is performed at step S58 to determine if BC is equal to a second predetermined value, END2, which is equal to the expected number of 4 bit words to be output plus one. If BC is not equal to END2, BC is incremented by one in step S60 and the program returns to step S56. If BC is equal to END2, control passes to step S62, in which flag F2 and j are reset to zero, and BC is reset to one. Step S32 is then performed to detect the next voice message.

As shown in FIGS. 2 and 5, in another preferred embodiment a vocoder 58 and an expander 80 are added to encoder 30 and decoder 62, respectively, to increase the data throughput of the pulse compression communication system.

Vocoder 58 advantageously is connected to the output of ADC 38 for bandwidth compressing the digitized voice words and generating a bandwidth compressed signal, which is stored in RAM 46. Preferably, vocoder 58 is a 4:1 digital compression device controlled by timing and control signal $T_{14}$ from controller 40. For example, without vocoder 58 in encoder 30, the voice message is sampled 6 times per msec, thereby producing 24 bits of data per msec for storage by RAM 46. Vocoder 58 generates only 6 bits of data per msec for storage, including both compressed data and control bits. Thus, vocoder 58 produces a 4:1 data compression, and increases the length of the voice message which can be transmitted over the communications system by a factor of four. Alternatively, the size of RAM 46 can be reduced to about 4500 bytes, which is large enough to store a 6 second voice message after 4:1 compression by vocoder 58.

Expander 80 receives data output from RAM 76 which includes both compressed data and control bits. Preferably, RAM 76 in this embodiment stores about 4500 bytes. Expander 80, responsive to the control bits within the 4 bit words and timing and control signal $T_{15}$ from controller 72, generates digital data from the compressed data at a rate of 24 bits per msec, the original sample rate.

For a communication system comprising vocoder 58 and expander 80, and assuming a convolver 66, 68 operating at 20 MHz, 256-chip pulses are transmitted in 12.8 $\mu s$. Thus, 4500 bytes can be conveyed in 57.6 msec. A 3° radar beam scanning 360° in 10 seconds would have a dwell time of 83.3 msec on any individual target. Thus, a 6 second voice message can be transmitted in the time it takes the beam to scan across the target.

In another preferred embodiment of the present invention, decoder 62 comprises only one of the convolvers 66, 68 by reducing the pulse repetition rate from transmitter 32. For example, assume convolver 66 operates at 20 Megahertz (MHz) and can therefore receive a 256-chip pulse every 12.8 $\mu s$. By reducing the pulse repetition rate from 12.8 $\mu s$ to a value greater than 25.4 $\mu s$, one convolver advantageously computes correlation values and thus simplify the decoder 62 circuitry.

In still another preferred embodiment, 128-chip convolvers are used in place of the 256-chip convolvers described above. Seven bit digitally coded words are then transmitted using the smaller convolvers, producing a pulse width of 6.4 $\mu s$ or $1.09 \times 10^6$ bits per second. For the embodiment just described, a 6 second voice transmission can be transmitted in 33 milliseconds.

In another preferred embodiment, the number of components in encoder 30 and decoder 62 are reduced by replacing the functions provided by individual components with further signals provided by controllers 40 and 72. For example, shift register 52 is replaced in this embodiment by a circular shift register implemented in software stored in ROM 44 and executed by CPU 42. Preferably, CFAR 70 in this embodiment is replaced by a discriminator loop in the program stored in ROM 78 and executed by CPU 74.

Other modifications and variations to the invention will be apparent to those skilled in the art from the foregoing disclosure and teachings. Thus, while only certain embodiments of the invention have been specifically described herein, is will be apparent that numerous modifications may be made thereto without departing from the spirit and scope of the invention.

What is claimed is:

1. A high data rate long pulse compression waveform communications system for air traffic control systems, comprising:
   a transmitter having a pulsed output signal;
   an encoder having a modulator coupled to said transmitter for encoding an analog voice message as a series of time shifted sequences of a predetermined code, said modulator modulating said pulsed output signal responsive to said time shifted code sequences;
   a receiver for receiving said modulated pulsed output signal and generating a series of digitally coded words; and
   a decoder coupled to said receiver for receiving said digitally coded words and generating said analog voice message in dependence on the correlation between said digitally coded words and a set of separately generated time shifted sequences of said predetermined code.

2. The high data rate long pulse compression waveform communications system of claim 1, wherein said encoder further comprises:
   first converter means for converting said analog voice message to a plurality of digitized voice words;
   first processing means for generating a succession of data bytes from successive pairs of said digitized voice words; and
   shift register means coupled to said modulator and to said first processing means for setting said time shifted code sequences responsive to said bytes.

3. The high data rate long pulse compression waveform communications system of claim wherein said encoder further comprises:
   a pulse generator coupled to said modulator;
   first converter means for converting said analog voice message to a plurality of digitized voice words;

first processing means for generating a succession of data bytes from successive pairs of said digitized voice words;

shift register means coupled to said modulator for setting said time shifted code sequences responsive to said bytes; and controller means coupled to said shift register means, said modulator and said pulse generator for controlling said pulse generator and said modulator to provide a modulated pulse to said transmitter for each of said time shifted code sequences output from said shift register means.

4. The high data rate long pulse compression waveform communications system of claim 1, wherein said decoder further comprises:

convolver means coupled to said receiver for computing a plurality of correlation values corresponding to the correlation between each of said digitally coded words and said set of separately generated time shifted code sequences; and converter means for converting said digitally coded words to said analog voice message according to the largest correlation values computed by said convolver means.

5. The high data rate long pulse compression waveform communications system of claim 1 wherein said decoder further comprises:

convolver means coupled to said receiver for computing a plurality of correlation values corresponding the correlation between each of said digitally coded words and said set of separately generated time shifted code sequences;

converter means for converting said digitally coded words to said analog voice message according to the largest correlation values computed by said convolver means; and controller means coupled to said convolver means and said converter means for controlling said convolver means and said converter means.

6. A high data rate long pulse compression waveform communications system for M-ary encoding voice messages for air traffic control systems, comprising:

a transmitter having a pulsed output signal;

an encoder coupled to said transmitter for receiving an analog voice message and modulating said pulsed output signal as a series of time shifted sequences of a predetermined code, said encoder comprising:

a pulse generator for generating said pulsed output signal;

a modulator coupled to said transmitter and to said pulse generator;

shift register means coupled to said modulator for generating each of said time shifted code sequences, said modulator modulating said pulsed output signal responsive to the serial output of said shift register means;

first converter means for converting said analog voice message to a plurality of digitized voice words; and controller means for controlling said shift register means according to sequential pairs of said digitized voice words;

a receiver for receiving said modulated pulsed output signal and generating a plurality of digitally coded words; and a decoder coupled to said receiver for generating said analog voice message, said decoder comprising:

convolver means for computing a plurality of correlation values between each of said digitally coded words and said set of separately generated time shifted code sequences;

processor means for determining the largest of said correlation values for each of said digitally coded words; and second converter means for converting said digitally coded words to said analog voice message according to said largest of said correlation values determined by said processor means.

7. The high data rate long pulse compression waveform communications system of claim 6, wherein said encoder further comprises vocoder means operatively connected to said first converter means for compressing said digitized voice words and wherein said decoder further comprises an expander means operatively connected between said processor and said second converter means for expanding the digitally coded words to be converted by said second converter means.

8. The high data rate long pulse compression waveform communications system of claim 6, wherein said time shifted code sequence is a 256 bit pseudo-random time shifted code sequence.

9. A high data rate long pulse compression waveform communications system having a transmitter generating a plurality of modulated pulsed output signals and having a receiver generating a plurality of digitally coded words responsive to the modulated pulsed output signals of the transmitter for M-ary encoding and decoding an analog voice message, comprising:

an encoder coupled to the transmitter for encoding said analog voice message and generating said modulated pulse output signals, said encoder comprising:

means for converting said analog voice message to a plurality of digitized voice words;

first storing means for storing said digitized voice words;

means for forming a succession of first integer data values from successive pairs of said digitized voice words;

shift register means for storing an initial predetermined code sequence and for shifting said predetermined code sequence responsive to said first integers to form corresponding time shifted code sequences; and modulator means for modulating said pulsed output signals with said time shifted code sequences to produce said modulated pulsed output signals;

a decoder coupled to said receiver for generating said analog voice message from said digitally coded words, said decoder comprising:

convolver means for computing a plurality of correlation values between each of said digitally coded words and a separately generated set of time shifted sequences of said predetermined code sequence;

means for comparing said correlation values and generating a plurality of second integer data values respectively corresponding to the largest correlation value computed for each of said digitally coded words; and means for generating said analog voice message responsive to said second integer data values.

10. The high data rate long pulse compression waveform communications system of claim 9, wherein said encoder further comprises means for modulating a first one of said pulsed output signals responsive to a message start code and wherein said decoder further comprises means for recognizing said message start code.

11. The high data rate long pulse compression waveform communications system of claim 9, wherein said predetermined code sequence is a 256 bit pseudo-random code sequence.

12. The high data rate long pulse compression waveform communications system of claim 9, wherein said encoder further comprises means for compressing said digitized voice words and wherein said decoder further comprises means for expanding said second integer data values.

* * * * *